July 28, 1936.  J. B. TIEDEMANN  2,048,960
CONVEYER
Original Filed Dec. 10, 1930    4 Sheets-Sheet 1
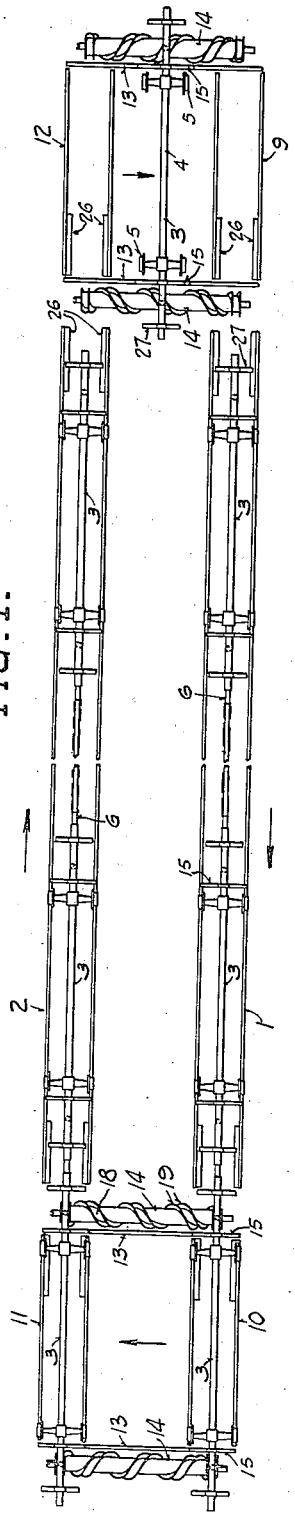
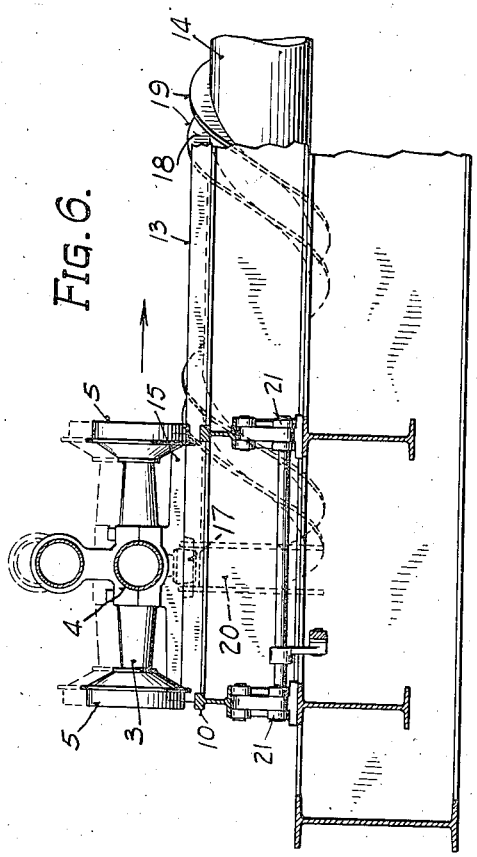
INVENTOR.
Julius B. Tiedemann
BY
ATTORNEY.

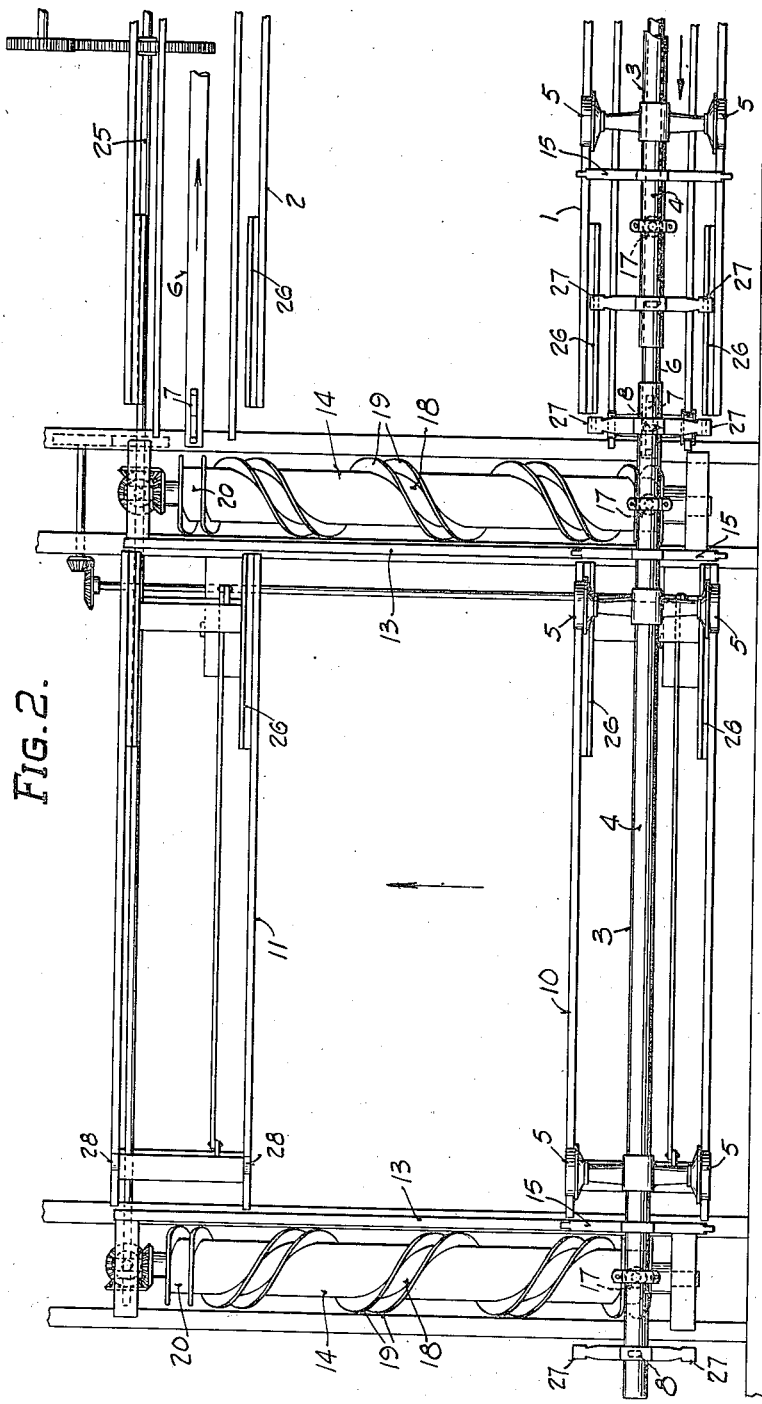

July 28, 1936.    J. B. TIEDEMANN    2,048,960
CONVEYER
Original Filed Dec. 10, 1930    4 Sheets-Sheet 3

INVENTOR.
Julius B. Tiedemann
BY
ATTORNEY.

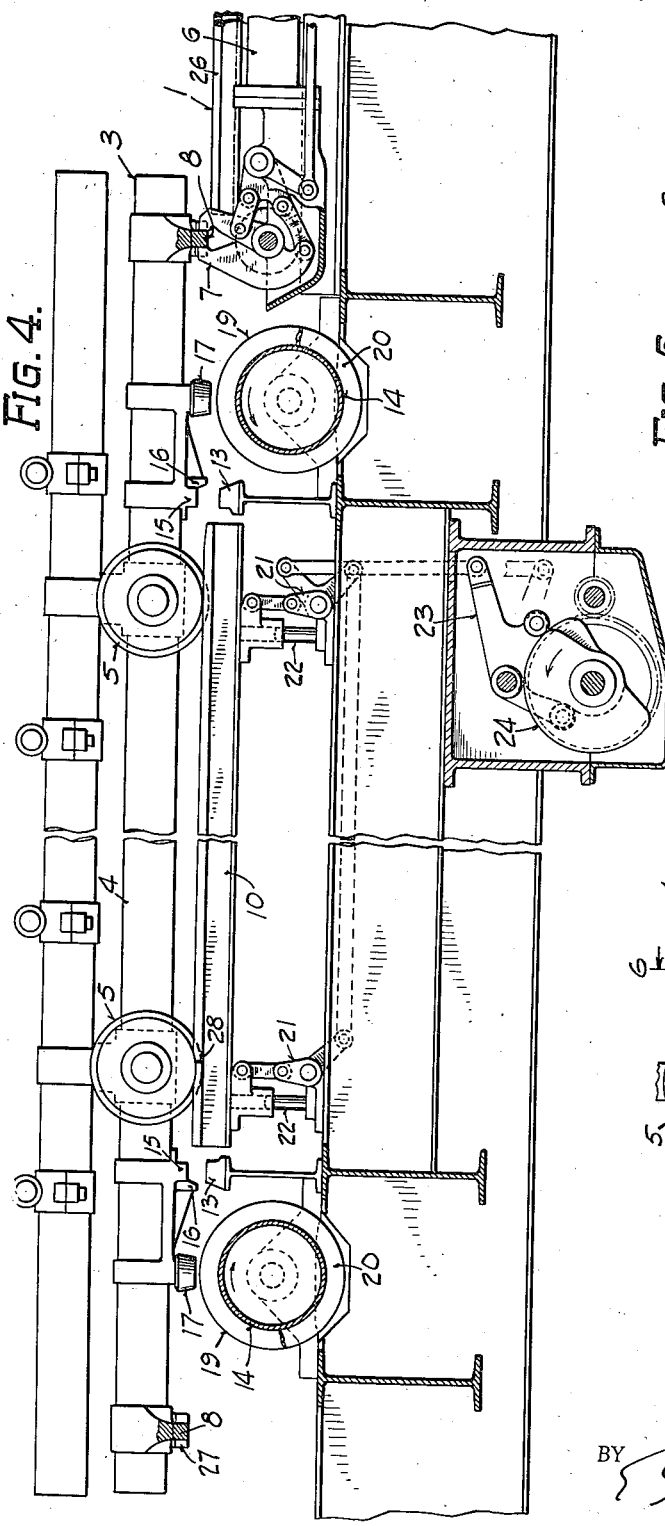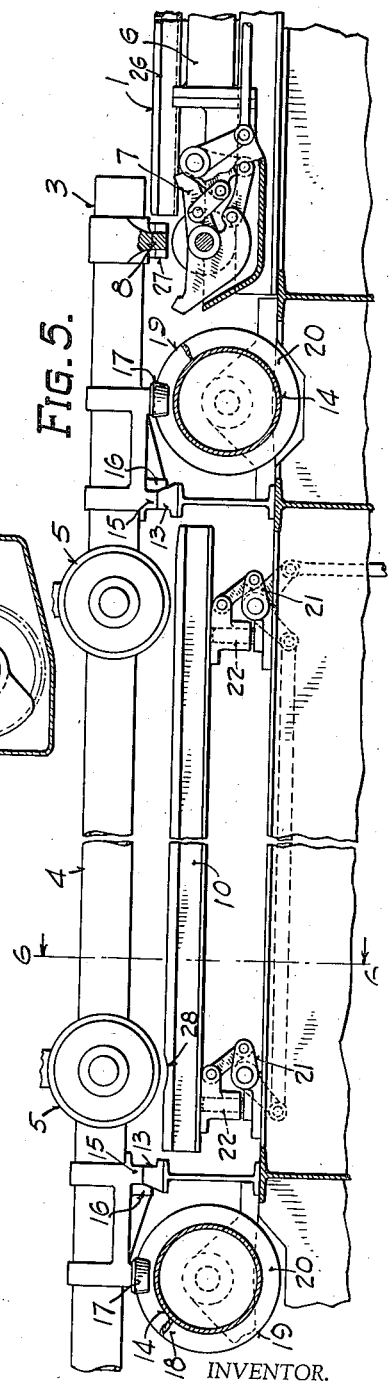

Patented July 28, 1936

2,048,960

UNITED STATES PATENT OFFICE 2,048,960

CONVEYER

Julius B. Tiedemann, Milwaukee, Wis., assignor to A. O. Smith Corporation, Milwaukee, Wis., a corporation of New York Original application December 10, 1930, Serial No. 501,301. Divided and this application January 31, 1935, Serial No. 4,402

14 Claims. (Cl. 104—48)

The invention relates to improvements in conveyer systems and more particularly to the transporting and conveying of parts such as automobile frames in the course of manufacture. In this manufacture the frame elements are conveyed upon trucks which move forward intermittently to present the elements to different successive work stations.

This application constitutes a division of copending application, Serial No. 501,301, filed December 10, 1930, by Birger T. Andren and Julius B. Tiedemann, for Art of manufacturing composite structures, and is directed more particularly to the conveyer mechanism there disclosed.

The object of the invention is to provide an improved and more simple mechanism for transferring the conveyer trucks from one track to another.

Other objects will appear hereinafter.

The accompanying drawings illustrate an embodiment of the invention, and

Figure 1 is a top plan view of a conveyer system employing the invention;

Fig. 2 is an enlarged plan view showing one end of the system;

Fig. 4 is an enlarged side view partially in section showing the end transfer mechanism;

Fig. 5 is a partial view similar to Fig. 4 showing the mechanism in another position of operation;

Fig. 6 is a fragmentary sectional view taken on the line 6—6 of Fig. 5.

Figure 3:
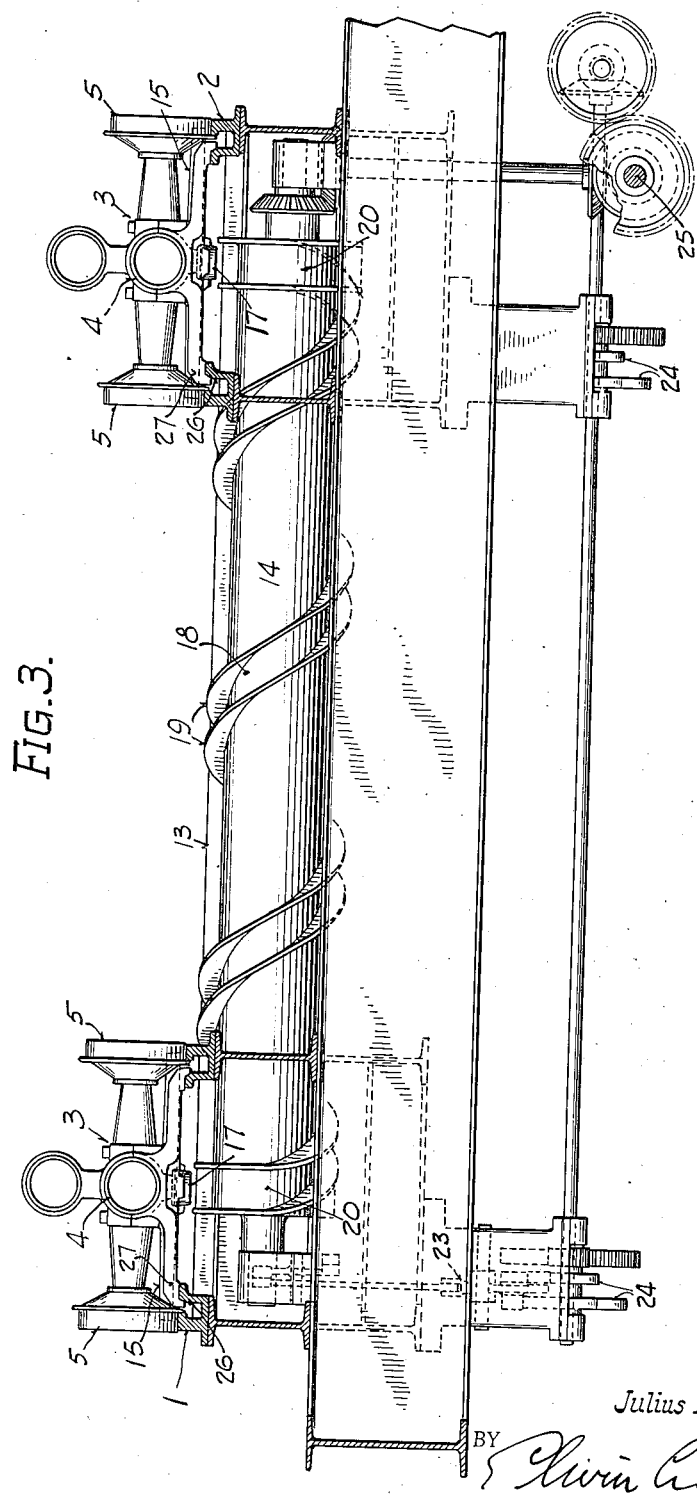
Fig. 3 is an enlarged end view partially in section of a part of the system.

The conveyer system illustrated comprises two parallel sets of tracks 1 and 2, and a plurality of trucks 3 disposed thereon for movement therealong in the direction of the arrows in Fig. 1. The trucks preferably move intermittently, although they may move continuously, and the construction of the trucks and main drive therefor may be of any suitable nature consistent with the features of the present invention.

In a factory, it is generally undesirable from requirements in economy in space to provide a continuous track circuit, it being of advantage to have two parallel sets of tracks, one for advancing the trucks in one direction and the other for returning the trucks in the other direction. In such case it is necessary to provide some means for readily transferring the trucks from the end of one set of tracks to the end of the other set.

The present invention relates to an improvement in such truck transferring mechanism. The invention has been employed in a system employing relatively large trucks as in the manufacture of automobile frames, and by reason of the large masses involved the problem of vibration and chatter is a large factor. Heretofore, attempts to transfer the trucks from one track laterally to another have not fully eliminated this difficulty.

In carrying out the invention, the lateral transfer mechanism provides for uniform and smooth acceleration and retardation of the truck, and means are provided at each end of the truck to effect equal movement of both ends so as to prevent chatter.

The trucks 3 consist of a body 4 supported by four flanged wheels 5 which run on the conveyer tracks 1 and 2. The trucks may be propelled along the tracks by any suitable means, that illustrated consisting of a reciprocating drive tube 6 extending longitudinally beneath the trucks of each set of tracks and having suitable jaws 7 thereon each of which is adapted to grip a lug 8 at the end of each truck. The jaws 7 are actuated automatically and simultaneously to grip the respective lugs 8 and advance the trucks the distance between operating stations. The jaws 7 then release the trucks and an automatic doweling system (not shown) accurately positions the trucks for work performing operations while the tube 6 returns to starting position.

As shown in Fig. 1, a supplemental track 9 is provided at the starting end of track 1, a supplemental track 10 is provided at the other end of track 1, a supplemental track 11 is provided at the starting end of track 2, adjacent to track 10, and a supplemental track 12 is provided at the finishing end of track 2 adjacent track 9. These supplemental tracks 9, 10, 11 and 12 are spaced from the respective ends of tracks 1 and 2 and are in alignment therewith. Each supplemental track is of a length for receiving and supporting one truck. The trucks are successively transferred laterally from track 10 to track 11 and also from track 12 to track 9 during the return stroke of tube 6.

The lateral transfer mechanism is the same at each end of the conveyer system and therefore will be described in detail as illustrated in Figures 2 to 6 for transferring trucks from track 10 to track 11. The mechanism comprises a transverse skid or track 13 at each end of the supplemental tracks 10 and 11 and extending laterally therebetween, and rotating screw drums 14 extending parallel with and adjacent the tracks 13. The truck 3 is supported on the tracks 13 while the screws 14 propel it laterally from track 10 to track 11.

The trucks 3 are provided with auxiliary skid shoes 15 at each end adapted to slide upon the skids 13 and having downwardly extending flanges 16 for holding the trucks in position during transfer. The trucks are also provided at each end with a central roller 17 having a vertical axis and adapted to ride in the screw groove 18 formed by the flanges 19 on the drums 14 to propel the truck laterally. At each end of the drums 14 a circumferential raceway 20 is provided to receive the rollers 17, and the screw groove 18 merges gradually into the raceways 20 to provide for gradual acceleration and retardation of the truck.

The screw drums 14 are constantly rotated at the same speed, but in opposite directions and the screw grooves 18 on the respective drums extend spirally around the drums in opposite directions, so that both ends of the truck 3 are moved laterally at the same speed, and with the same acceleration and retardation of movement at the ends.

When a truck 3 is in position on track 10 ready for lateral transfer, the track 10 is lowered to place the truck onto the skids 13 and the rollers 17 are thereby lowered into the circumferential raceways 20 from which they pass into the screw grooves 18 effecting lateral movement of the truck. The track 11 is in lowered position ready to receive the truck, and as the latter reaches a position over track 11 with the rollers 17 in the circumferential raceways 20, the track 11 is raised, lifting the truck from skids 13 and the rollers are raised out of the raceways 20. The truck is lifted to a level corresponding with those on track 2 and is then advanced onto and along track 2.

The tracks 10 and 11 are raised and lowered in timed sequence to the operation of the conveyer system and the tubes 6. For this purpose the track 10 is supported on cranks 21 at each end with vertical pins 22 serving as guides to hold the tracks in position. The cranks 21 are operated from a lever 23 riding on a rotating cam 24 shown in detail in Fig. 4. The cam 24 is rotated through a train of gears from a main drive shaft 25 which also drives the screw drums 14 and which is driven from the main power source that drives the tubes 6. Thus, the entire mechanism operates in synchronism. Tracks 9, 11 and 12 are raised and lowered in the same manner as track 10. Tracks 9 and 10 are raised at the same time as tracks 11 and 12 are lowered, and vice versa.

Since the supplemental tracks 9, 10, 11 and 12 are spaced from the ends of tracks 1 and 2 to give room for the skids 13 and drums 14, it is necessary to provide means for supporting the trucks 3 as they are advanced across the gaps between the track ends. This is accomplished by providing auxiliary longitudinally extending skids 26 parallel to the tracks for a predetermined distance at each end and complementary skid shoes 27 on the ends of the trucks adapted to ride on the skids 26 during the period when the wheels 5 of the trucks are unsupported by the tracks as the truck is being advanced onto or off from the supplemental tracks.

In order to position the trucks on the supplemental tracks during raising or lowering of the latter, the tracks have predetermined depressions 28 in their upper surfaces for receiving the wheels 5 of the trucks and preventing free longitudinal movement of the trucks.

Various modifications and embodiments may be employed without departing from the spirit and scope of the invention as expressed in the accompanying claims.

I claim:

1. In apparatus for manufacturing composite structures, a conveyer system comprising two substantially parallel sets of rails, a plurality of cars mounted on the rails, means for propelling the cars, means disposed at the end of the rails for supporting the cars during transfer from one set of rails to the other, and horizontal screw conveyers at the end of the rails for periodically receiving and transferring a car from one set of rails to the other.

2. In apparatus for manufacturing composite structures, a conveyer system comprising two substantially parallel sets of rails, a plurality of cars mounted on said rails, a reciprocable driving means for intermittently propelling the cars along the rails, means disposed at the respective ends of the rails for supporting the cars during lateral transfer, and a pair of horizontal screw conveyers at opposite ends of the rails for laterally transferring the cars from one set of rails to the other.

3. In an assembly system, a conveyer circuit comprising two substantially parallel sets of rails, a plurality of cars arranged on said rails, means for propelling said cars along the rails, means at opposite ends of the rails for transferring cars from one set of rails to the other, each transfer means comprising a car support disposed at the end of each of the sets of rails, each support being movable along vertical lines, means for raising and lowering the supports to receive and deliver the cars, and means disposed between the supports for transferring cars from one support to another.

4. In an assembly system, a conveyer circuit comprising two substantially parallel sets of rails, a plurality of cars arranged on said rails, means for propelling said cars along the rails, and means at opposite ends of the rails for transferring cars from one set of rails to the other, each transfer means comprising a pair of rail sections disposed at the ends of each of the sets of rails, means for raising and lowering said pairs of rail sections into and out of alignment with the sets of rails to receive and deliver the cars, and means disposed in cooperative relation with the rail sections and the means for actuating them to transfer a car from one set of rails to another.

5. In an assembly system, a conveyer circuit comprising two substantially parallel sets of rails, a plurality of cars arranged on said rails, means for propelling said cars along the rails, and means at opposite ends of the rails for transferring cars from one set of rails to the other, the transfer means comprising a pair of rail sections disposed at the end of each of the sets of rails for movement along vertical lines, a pair of screw conveyers extending between the pairs of rail sections and means for raising and lowering the pairs of rail sections into and out of alignment with the sets of rails to receive and deliver cars, the screw conveyers being disposed to transfer the cars from one pair of rail sections to another as the pairs of rail sections are actuated through their paths.

6. In an assembly system, a conveyer circuit comprising two substantially parallel sets of rails, a plurality of cars arranged on said rails, means for intermittently propelling said cars along the rails, and means at opposite ends of the rails for transferring cars from one set of rails to the other, each transfer means comprising a car support disposed at the end of each of the sets of rails, screws extending between said supports and means for intermittently raising and lowering said supports into and out of alignment with the sets of rails to receive cars from one set of rails and deliver the cars to the screws and to remove cars from the screws and position the same for delivery to the other set of rails, and a common drive for actuating the car propelling means, the support raising and lowering means, and the screws in properly timed relation.

7. In an assembly system, a conveyer circuit comprising two substantially parallel sets of rails, a plurality of cars arranged on said rails, means for intermittently propelling said cars along the rails, and means at opposite ends of the rails for transferring cars from one set of rails to the other, each transfer means comprising, a car support disposed at the end of each of the sets of rails, screw conveyers extending between said supports, means for continuously rotating the screw conveyers, and means for intermittently raising and lowering the supports into and out of alignment with the sets of rails to receive cars thereon from one set of rails and deliver the cars to the screw conveyers and to remove cars from the conveyers to position the same for delivery to the other set of rails, and a common drive for actuating the car propelling means and the support raising and lowering means in properly timed sequence and driving the conveyer rotating means.

8. In an assembly system, a conveyer circuit comprising two substantially parallel sets of rails, a plurality of cars arranged on the rails, skid shoes carried by the cars, means for propelling the cars along the rails, and means at opposite ends of the rails for transferring cars from one set of rails to the other, each transfer means comprising, a car support disposed at the end of each of the sets of rails, a pair of skid tracks extending between said supports, the skid tracks being spaced apart a distance equal to the distance between the skid shoes on the cars for cooperation therewith, means for actuating the supports to transfer the cars between the rails and skid tracks, and means for moving the cars on the skid tracks cooperative to effect the transfer of the cars from one set of rails to another.

9. In an assembly system, a conveyer circuit comprising two substantially parallel sets of rails, a plurality of cars arranged on said rails, each of the cars having skid shoes and depending arms on opposite ends thereof, means for propelling the cars along the rails, and means at opposite ends of the rails for transferring cars from one set of rails to the other, each transfer means comprising a vertically movable pair of rail sections disposed at the end of each of the sets of rails, a pair of skid tracks and a pair of screw conveyers extending between the pairs of rail sections, the skid tracks being spaced apart a distance equal to the distance between the skid shoes and the screw conveyers spaced apart a distance equal to the distance between the depending arms on the cars for cooperation therewith, and means for raising and lowering the rail sections into and out of alignment with the sets of rails to receive cars from one set of rails and carry the skid shoes into and out of engagement with the skid tracks and the depending arms with the screw conveyers, to effect a transfer of the cars from one set of rails to the other.

10. In a conveyer system, a plurality of sets of rails having their corresponding ends adjacent for making up a conveyer circuit, a plurality of conveyer cars mounted for intermittent movement on said rails, and means disposed at the corresponding adjacent ends of said sets of rails for transferring each car as it travels to the end of one set of rails laterally over to the corresponding adjacent end of another set of rails, said last named means comprising, means for supporting a car during lateral movement and continuously rotating means at each end of the car operating in synchronism to engage the car and move the same laterally a predetermined distance from one track to another.

11. In a conveyer system, two sets of rails having their corresponding ends adjacent for making up a conveyer circuit, a plurality of conveyer cars mounted for movement on said rails, and means disposed at the corresponding adjacent ends of said sets of rails for transferring each car as it travels to the end of one set of rails laterally over to the corresponding adjacent end of another set of rails, said last named means comprising, means for supporting a car during lateral movement, a pair of screw elements continuously rotating in synchronism for effecting lateral movement of a car, means on each car for engaging said screw elements and means for effecting engagement of said last named means with said screw elements at the beginning of a car transferring operation and for disengaging the same at the completion of a car transferring operation.

12. In a conveyer system, a plurality of sets of rails having their corresponding ends adjacent for making up a conveyer circuit, a plurality of conveyer cars mounted for movement on said rails, and means disposed at the corresponding adjacent ends of said sets of rails for transferring each car as it travels to the end of one set of rails laterally over to the corresponding adjacent end of another set of rails, said last named means comprising, means for supporting a car during lateral movement and continuously rotating means at each end of the car operating in synchronism to engage the car and move the same laterally a predetermined distance from one track to another.

13. In a conveyer system a track, a conveyer truck mounted thereon, supporting means at the end of said track for receiving said truck, means for withdrawing said supporting means and disposing said truck upon a lateral transfer mechanism, said lateral transfer mechanism being adapted to deliver said truck in alignment with a return conveyer track.

14. In an apparatus of the class described, a conveyer system comprising two sets of rails, a conveyer truck mounted on one of said rails and being of substantial length, means for receiving and supporting said truck during lateral transfer from one set of rails to the other, and screw means for engaging said truck at each end to move it at uniform speed during lateral transfer thereof.

JULIUS B. TIEDEMANN.